No. 669,262. Patented Mar. 5, 1901.
J. W. McINTOSH.
WAGON BRAKE.
(Application filed Nov. 20, 1900.)
(No Model.)
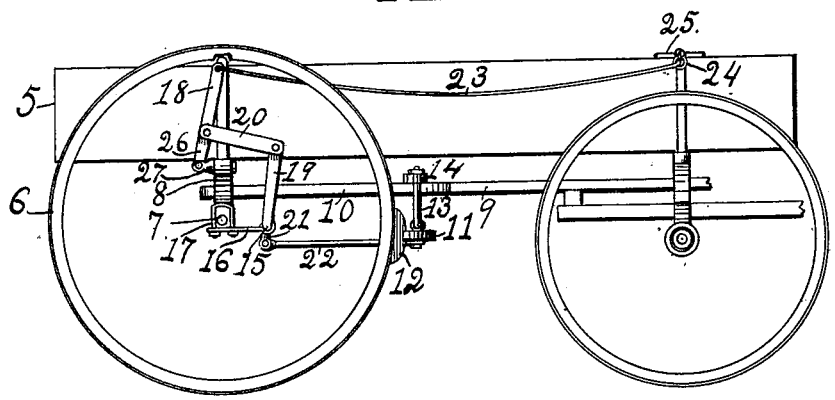
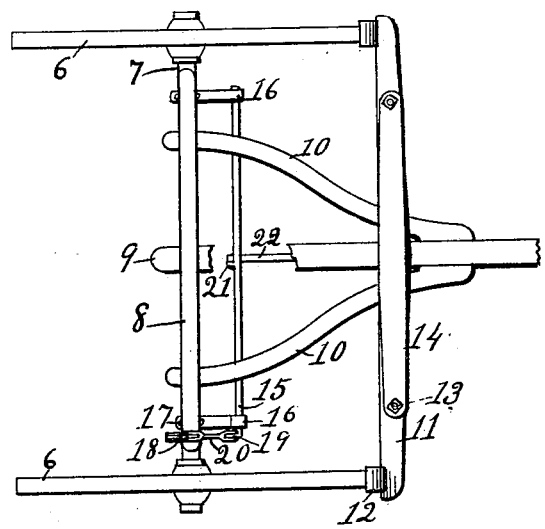
Witnesses
N. Stevens
E. Gray.
Inventor
John W. McIntosh.
by W. K. Stevens, Attorney

UNITED STATES PATENT OFFICE.

JOHN W. McINTOSH, OF KNOBNOSTER, MISSOURI, ASSIGNOR OF TWO-THIRDS TO NATHANIEL T. COOK AND WASHINGTON J. HUTSON, OF FLATWOODS, TENNESSEE.

WAGON-BRAKE.

SPECIFICATION forming part of Letters Patent No. 669,262, dated March 5, 1901.

Application filed November 20, 1900. Serial No. 37,157. (No model.)

*To all whom it may concern:*

Be it known that I, JOHN W. MCINTOSH, a citizen of the United States, residing at Knobnoster, in the county of Johnson and State of Missouri, have invented a new and useful Improvement in Wagon-Brakes; and I do hereby declare the following to be a full, clear, and exact description of the same.

This invention relates to that class of wagon-brakes which act to retard or stop the wheels; and its objects are, first, to provide means whereby the brake may be wholly supported on the running-gear of the wagon, so as to be serviceable when the body is left off, and, secondly, to provide means whereby the brake may be operated either by the driver sitting on the wagon-seat or by a person in the wagon or upon the wagon-gear or traveling on the ground behind the wagon.

To these ends my invention consists in the construction and combination of parts forming a wagon-brake, hereinafter more fully described and claimed, reference being had to the accompanying drawings, in which—

Figure I represents in side elevation a wagon with my brake in service. Fig. II is a top view of the rear portion of the running-gear of a wagon with my brake ready for service.

Numeral 5 represents the body of a wagon, and 6 the hind wheels, mounted on the axle 7.

8 is a bolster mounted on axle 7.

9 is the reach, and 10 the rear hounds.

11 is my brake-bar, to which shoes 12 may be attached to bear on the wheels 6. This bar 11 is loosely hung by links 13 upon a beam 14, that is rigidly secured upon the hounds 10.

15 is a rock-shaft journaled to rock in bearings in arms 16, that are secured rigidly by clip-bolts 17 upon the axle 7.

18 is the operating lever or handle, pivoted to an eyebolt 27, that passes through bolster 8 and is firmly fixed therein. This lever is connected with the upper arm 19 of the rock-shaft by a rod 20. The lower arm 21 of the rock-shaft is connected by a rod 22 with the brake-bar 11 at its center. The handle 18 may be provided with a chain or line 23, leading to some point, as the ring 24, within reach from the driver's seat 25.

In operation if the line 23 be pulled forward the handle 18, pushing by the rod 20 upon arm 19, will rock the shaft 15 and swing the arm 21 backward, pulling by means of rod 22 upon the brake-bar 11 and pressing the shoes 12 upon the two hind wheels with force very much greater than the hand-pressure that generates it, owing to the leverage obtained through the long receiving-arms 18 and 19 and the short delivering-arms 26 and 21.

The brake-bar 11 being supported upon the hounds, the hand-lever 18 upon the bolster, and the rock-shaft 15 upon the axle, the whole device is complete and independent of the removable body 5, so that the brake may be used when the wagon-gear alone is in service.

The handle 18 may be reached by a person in the wagon to apply the brake without the aid of the line 23, or a person walking behind the wagon may push forward upon the handle to apply the brake if the wagon is overhung by a load of hay.

Having thus fully described my invention, what I believe to be new, and desire to secure by Letters Patent, is the following:

1. The combination in wagon-brakes, of a brake-bar located across in front of the hind wheels; hangings for freely supporting the brake-bar upon the wagon-hounds; arms provided with clip-bolts for attachment to the wagon-axle; a rock-shaft journaled in the said arms and provided with one downward and one upward projecting arm; an eyebolt adapted to be secured to a bolster of the wagon; an operating-lever pivoted to the said eyebolt; a rod connecting the operating-lever with one arm of the rock-shaft and another rod connecting the other arm of the rock-shaft with the said brake-bar, substantially as described.

2. In wagon-brakes, a brake-bar freely hung upon the rear hounds of the wagon; a rock-shaft provided with arms and hung upon the rear axle; an operating-lever hung upon the rear hounds, and connections substantially as described between the operating-lever, rock-shaft and brake-bar, as and for the purpose specified.

In testimony whereof I affix my signature in presence of two witnesses.

JOHN W. McINTOSH.

Witnesses:
J. C. PETERSON,
N. T. COOK.